United States Patent [19]

Koshizawa et al.

[11] Patent Number: 4,864,504
[45] Date of Patent: Sep. 5, 1989

[54] CONTROL APPARATUS FOR MAINTAINING BRAKING FORCE

[75] Inventors: Toshifumi Koshizawa, Kawasaki; Yoshihiro Matsukubo, Ebina, both of Japan

[73] Assignee: Isuzu Motors Limited, Tokyo, Japan

[21] Appl. No.: 63,428

[22] Filed: Jun. 18, 1987

[30] Foreign Application Priority Data

Jun. 26, 1986 [JP] Japan ................................ 61-150543

[51] Int. Cl.⁴ .............................................. B60T 8/32
[52] U.S. Cl. .................................. 364/426.02; 303/95
[58] Field of Search ..................... 364/426.01, 426.02; 180/197; 303/95, 97, 99, 105, 107

[56] References Cited

U.S. PATENT DOCUMENTS 4,610,483  9/1986  Matsumoto et al. ................ 303/97
4,712,839  12/1987  Brearley et al. .................... 303/107

Primary Examiner—Gary Chin
Attorney, Agent, or Firm—Staas & Halsey

[57] ABSTRACT

A control apparatus is provided for maintaining a braking force in an automotive vehicle for calculating the rate at which vehicle velocity decreases when braking is applied, and for inhibiting braking force maintenance control within a predetermined period of time after brake release when the rate of velocity decrease exceeds a predetermined value. The braking force maintaining function is prevented from operating erroneously by distinguishing between a state in which the vehicle is at rest and a state in which the vehicle wheels are locked up.

7 Claims, 3 Drawing Sheets

CONTROL APPARATUS FOR MAINTAINING BRAKING FORCE

CROSS-REFERENCE TO RELATED APPLICATION

The invention of this application represents an improvement over the invention described in Japanese Patent Application No. 58-118459 (Japanese Patent Application Laid-Open No. 60-12360).

BACKGROUND OF THE INVENTION

1. Field of the Invention:

This invention relates to a control apparatus for maintaining braking force in an automotive vehicle controlled by an electronic control unit, particularly an automotive vehicle equipped with an automatic transmission with a friction clutch controlled by an electronic control unit.

2. Description of the Related Art:

When a vehicle is to be stopped on an upgrade and then moved forward from rest, the driver first engages the hand brake with one hand to stop the vehicle. Then, while engaging the clutch, the driver steps down on the accelerator pedal and slowly releases the hand brake to allow the vehicle to move forward. In a case where the vehicle cannot be stopped on the upgrade effectively because the braking force applied by the hand brake alone is insufficient, the driver steps down on the brake pedal with his right foot to stop the vehicle. The driver then withdraws his left foot from the clutch pedal and, while this is being done, transfers his right foot from the brake pedal to the accelerator pedal to raise the engine rpm. As the engine rpm is being raised, the vehicle is propelled forward when the clutch is engaged in concurrence with removal of the driver's foot from the brake pedal. The changeover between the brake pedal and accelerator pedal and the operation to engage the clutch must be performed at a certain timing or else the engine will stall. These operations require that the driver have a high level of skill.

In order to eliminate this inconvenience, the applicant has proposed a control apparatus for maintaining braking force disclosed in the specification of Japanese Patent Application Laid-Open No. 60-12360 cited hereinabove as a cross-reference.

This previously disclosed control apparatus is applied to an automotive vehicle having an automatic transmission equipped with a friction clutch, that is controlled by an electronic control unit and is adapted to collectively interpret signals from various vehicle sensors, maintain braking force when the vehicle is stopped by operation of a brake, and hold the braking force until a clutch is engaged by operation of a clutch actuator when the vehicle is propelled forward from rest. This makes it possible to start the vehicle moving forward again on an upgrade without requiring that the driver have a high level of skill.

When a braking force is applied at such time that the vehicle is traveling on a road surface having little friction, as when the road surface is covered with snow or ice, the wheels may lock and allow the vehicle to continue skidding along the road even though the wheels have stopped. An extremely hazardous situation can result if the control apparatus does not distinguish between this state and the state in which the vehicle is truly at rest. In order to prevent erroneous operation in terms of the braking force maintaining function, the conventional apparatus is designed to recognize the wheel locking state based on the rate at which vehicle velocity decreases.

More specifically, when the rate of decrease in vehicle velocity is high at braking, wheel locking is judged to be occurring and the braking force holding function (HSA) is inhibited when the driving system for the wheels is stopped. When a signal indicative of brake pedal depression vanishes, namely when the braking force is removed, the inhibition on the HSA is canceled. Consequently, when the brake pedal is stepped down on repeatedly in a short period of time, namely when the brakes are "pumped", the inhibition on the HSA is removed immediately after the braking force vanishes, even if wheel locking is detected. As a result, the HSA may operate erroneously due to a time delay in the electronic control unit.

SUMMARY OF THE INVENTION

An object of the present invention is to provide a braking force maintaining apparatus so adapted that the braking force holding function will not operate erroneously even if wheel locking occurs when the brakes are pumped.

According to the present invention, the foregoing object is attained by providing a control apparatus for maintaining braking force in which a braking force holding valve arranged in a brake operating fluid system is controlled. The apparatus comprises vehicle velocity sensing means for sensing vehicle traveling velocity, arithmetic means for calculating a rate of decrease in vehicle velocity based on a signal from the vehicle velocity sensing means, brake operation sensing means for sensing whether the vehicle is being braked, means for measuring time after the brake is released based on a brake release signal from the brake operation sensing means after the brake is operated, and control means for inhibiting holding control of the braking force holding valve within a predetermined period of time after brake release when the rate of decrease in vehicle velocity is greater than a predetermined value.

Thus, the control apparatus of the invention is adapted to inhibit operation of the braking force holding valve within a predetermined period of time after brake release when the rate at which vehicle velocity decreases is greater than a predetermined value. The apparatus is capable of distinguishing between a state in which the vehicle is at rest and a state in which the wheels are locking during at braking. Erroneous operation of the braking force holding function is eliminated even if the wheels lock when they are being pumped while the vehicle is traveling on a road surface having little friction. This assures that the vehicle will travel safely.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

The preferred embodiment of a control apparatus according to the present invention will now be described in detail with reference to the drawings.

Figure 1:
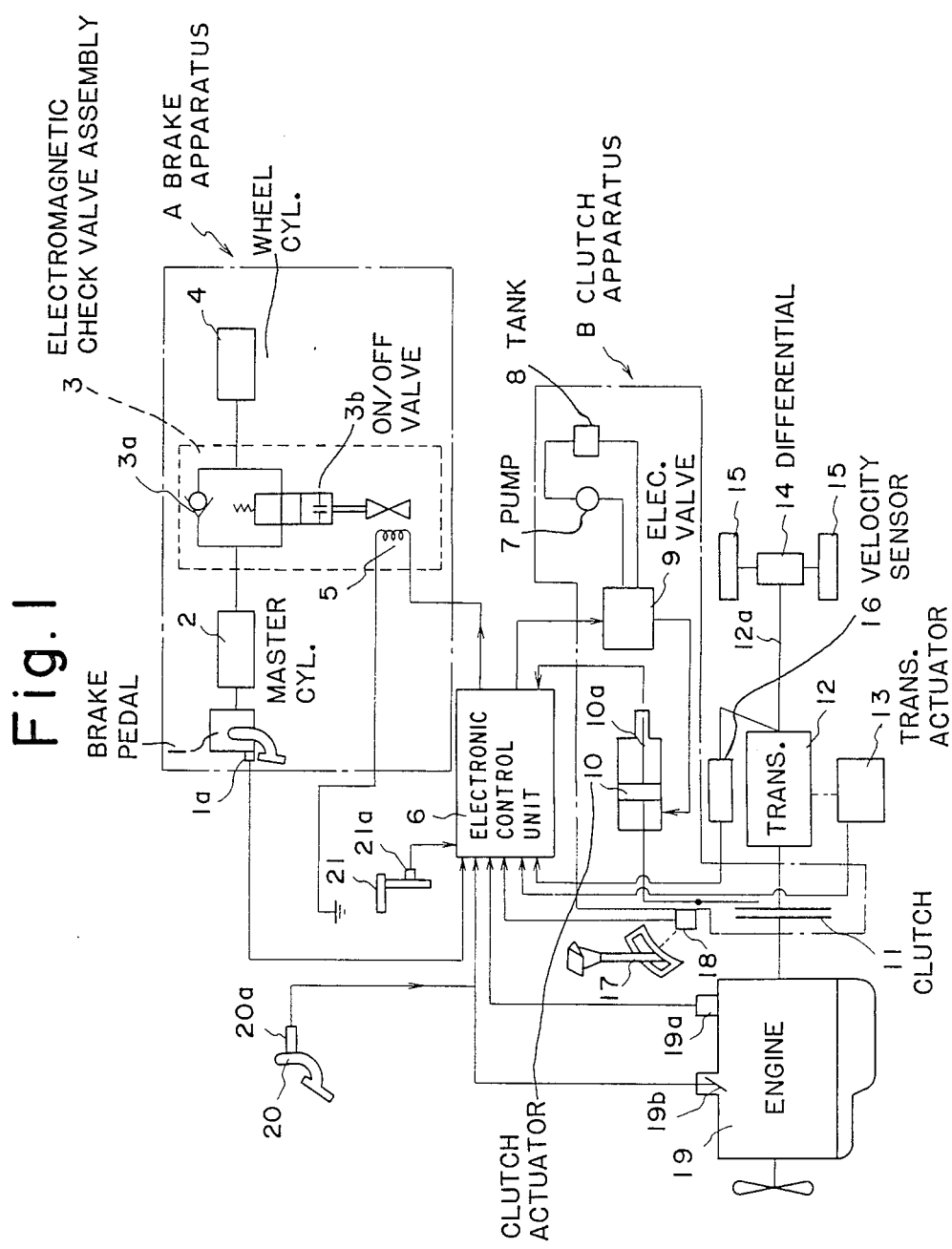
FIG. 1 is a block diagram illustrating an embodiment of the overall arrangement of an apparatus for controlling the holding of a braking force in a vehicle having an electronically controlled automatic transmission.

In FIG. 1, a brake apparatus A comprises a brake pedal 1, a brake pedal switch (1a) for sensing operation of the brake pedal 1, a master cylinder 2 operated by the brake pedal 1, an electromagnetic check valve assembly 3 serving as a braking force holding valve arranged in an operating hydraulic pressure system between the master cylinder 2 and a wheel cylinder 4, and an electromagnetic coil 5. The electromagnetic check valve assembly 3 for maintaining the braking force comprises a check assembly 3a which allows a brake fluid to flow from the master cylinder 2 to the wheel cylinder 4 but not in the opposite direction, and an electromagnetic on/off valve 3b arranged in parallel with the check valve 3a. The flow of the brake fluid is controlled by opening and closing the on/off valve 3b via the electromagnetic coil 5. When the coil 5 is in the energized state, the braking force holding function performed by the electromagnetic check valve assembly 3 is maintained independently of the state of brake pedal 1. When the coil 5 is deenergized, the braking force holding operation is disabled.

An electronic control unit 6 comprising a microcomputer collectively controls signals from various vehicle sensors described below, inclusive of the brake pedal switch 1a. The electronic control unit 6 controls the energization of the electromagnetic coil 5 for the purpose of maintaining the braking force, and controls the deenergization of the coil 5 in synchronism with the engagement of a clutch. A clutch apparatus B comprises a pump 7, a tank 8, an electromagnetic valve 9 for a clutch actuator, a clutch actuator 10 having clutch stroke sensor 10a, and a friction clutch 11.

Numeral 12 denotes a transmission having an output shaft 12a connected to a differential gear 14 for transmitting output to wheels 15. Numeral 13 denotes an actuator for the transmission 12. Connected to the output shaft 12a of the transmission 12 is a vehicle velocity sensor 16 the output signal of which is supplied to the electronic control unit 6. A select lever 17 is connected to the electronic control unit 6 via a select position switch 18 for setting the transmission 12 to a prescribed gear stage.

An engine 19 is connected to the clutch 11 and has its rpm controlled by the on/off action of a throttle valve 19b, which is done by stepping down on the accelerator pedal 20. The engine 19 is provided with an engine rotation sensor 19a, the output signal of which is applied to the electronic control unit 6 together with an output signal from an accelerator pedal sensor 20a provided on the accelerator pedal 20 for sensing the amount of depression thereof. The output signals of the accelerator pedal sensor 20a and the vehicle velocity sensor 16 decide the optimum gear stage of the transmission. These signals are processed within the electronic control unit 6 in such a manner that the clutch actuator 10 and transmission actuator 13 are controlled by a speed change signal. The clutch stroke sensor 10a supplies the electronic control unit 6 with a signal representing the amount of engagement (i.e. the stroke) of clutch 10 between the engaged position and disengaged position.

Numeral 21 denotes a parking brake lever having a parking brake switch 21a for sensing whether the parking brake lever 21 is engaged or disengaged and for outputting a signal indicative thereof to the electronic control unit 6.

When the vehicle has been brought to rest by an ordinary braking operation, each of the following conditions exist: the select lever 17 is in a position other than neutral, vehicle velocity is zero, the clutch 11 is disengaged, the transmission 12 is in one of its speeds, the engine is rotating, the accelerator pedal 20 is not being depressed, and the brake pedal 1 is being operated by the driver's foot. Under these conditions, the electronic control unit 6 energizes the electromagnetic coil 5 to actuate the electromagnetic on/off valve 3b, whereby the braking fluid pressure is confined between the valve assembly 3 and the wheel cylinder 4 to maintain the braking force.

If the vehicle is now propelled forward and the amount of engagement of clutch 11 is caused to exceed a predetermined value by a series of operations to start the vehicle moving forward, the electronic control unit 6 deenergizes the electromagnetic coil 5 to turn off the electromagnetic on/off valve 3b, thereby releasing the braking force.

The control operation performed by the apparatus of the invention will now be described with regard to the flowchart of FIGS. 2(A), 2(B).

First, a step a calls for the vehicle velocity signal to be read in from the vehicle velocity sensor 16 at a set time period. This is followed by a step b, at which the electronic control unit calculates the rate of change in vehicle velocity based on a preceding value of vehicle velocity and the present value of vehicle velocity. Next, when a brake signal is read in from the brake switch 1a at a step c, the electronic control unit 6 checks a predetermined storage area within the control unit to determine whether an HSA inhibit flag has been stored there. The electronic control unit 6 thus decides at a step d whether to inhibit operation of the braking force holding function or permit the holding function to be performed.

If the HSA inhibit flag is not found, then the braking force holding function is allowed and inhibit conditions from step e onward are checked. Specifically, on the basis of the calculated rate of change in vehicle velocity, the rate of decrease in vehicle velocity is compared with a set value indicative of the wheel lock-up state (step e). If the rate of decrease is equal to or greater than the set value, the HSA inhibit flag is set immediately to logical "1" at a step f to inhibit the operation of the braking force holding function. This is followed by a step g, at which a set value is written into timer means, e.g. a counter, for setting inhibit time.

If the HSA inhibit flag is found to be present (i.e. logical "1") at step d, this means that the braking force holding function has been inhibited since the immediately preceding cycle of operation. In such case, inhibit cancellation conditions from a step h onward are checked. Specifically, step h calls for a determination, based on the outputted brake signal, as to whether the braking force is in the process of vanishing, i.e. whether the brake pedal 1 is being depressed or is in the process of being released. If the brake pedal is in the process of being released and the count recorded in the aforementioned counter is found to be non-zero at a step i, then the count is decremented at a step j. If the count is found to be zero at a step k due to the decrementing operation, then the HSA inhibit flag is made logical "0" to cancel the inhibition on the braking force holding function, thus enabling the braking force holding operation (step 1).

If the decision rendered at step h is that the brake pedal is in the process of being depressed, meaning that the braking force is being applied, this indicates the brake pumping state. Accordingly, the program proceeds to step f and then step g, at which the counter is reset in order to reset the inhibit time.

Figure 2:
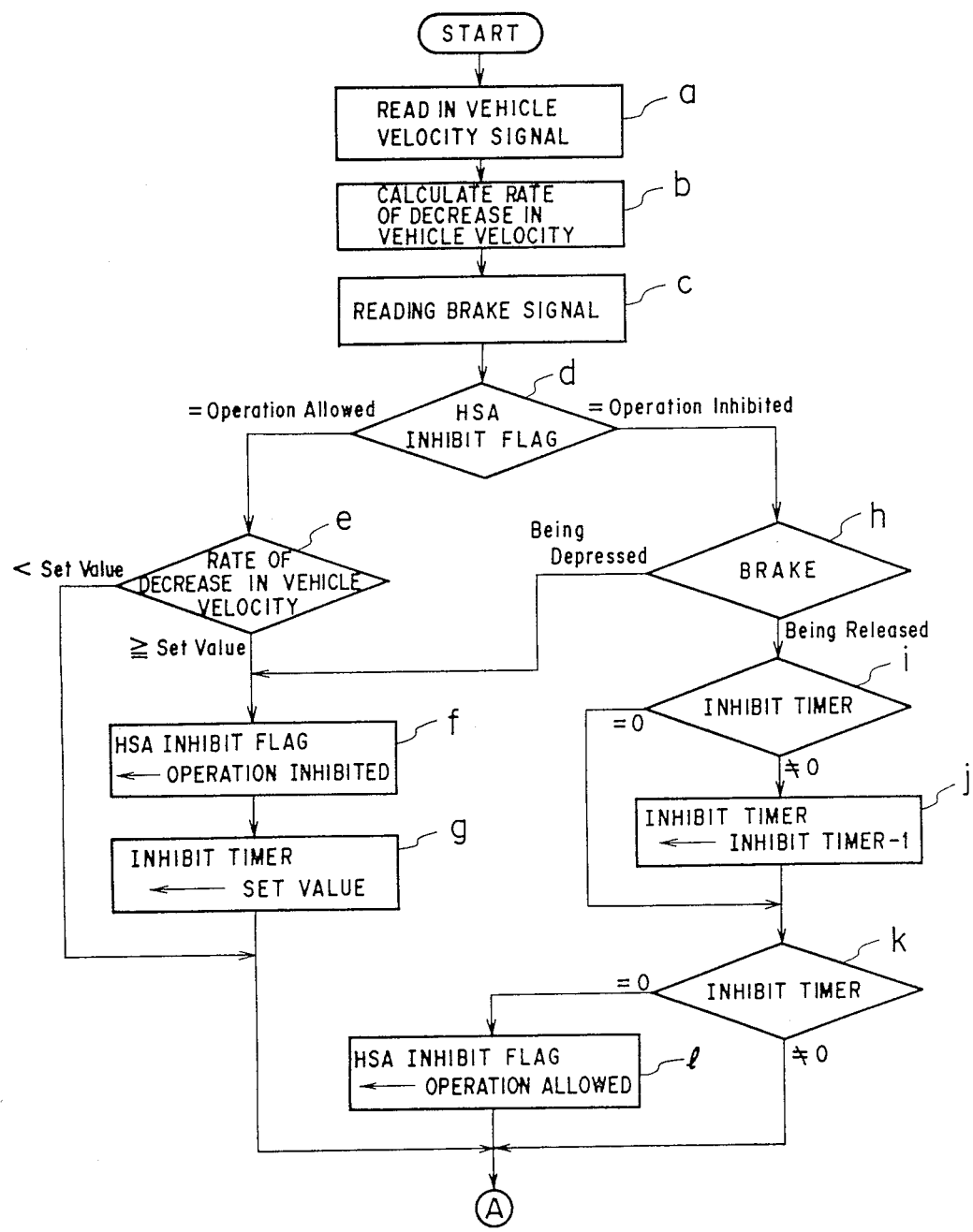
FIGS. 2(A), 2(B) are flowcharts illustrating an example of braking force holding function (HSA).
Figure 2:
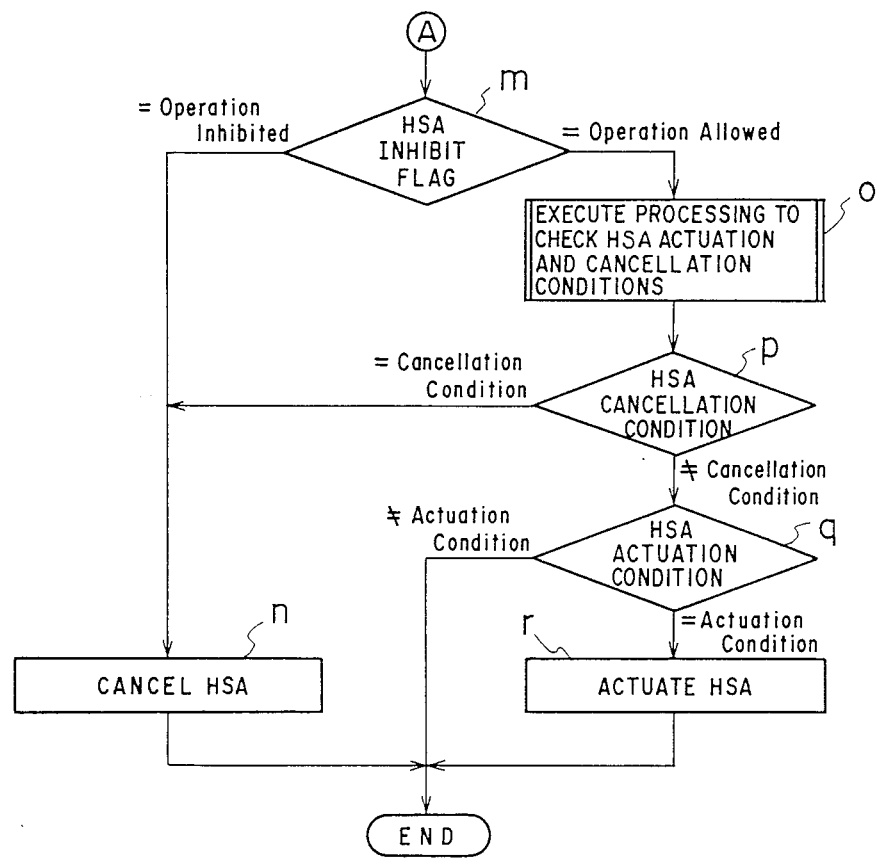

From step 1 the program proceeds to a step m [FIG. 2(B)], at which the status of the HSA inhibit flag is checked.

When the operation of the braking force holding function is inhibited in accordance with the status of the HSA inhibit flag decided as set forth above, the program proceeds from step m to a step n, at which the braking force holding function is canceled, on the other hand, if operation of the braking force holding function is allowed, the program proceeds to a step o, at which the ordinary brake conditions and select lever condition are checked and the clutch engagement/disengagement condition is processed. This is followed by checking the HSA cancellation condition at a step p and the HSA actuation condition at a step q. If the HSA cancellation condition is not satisfied and, moreover, the HSA actuation condition is satisfied, then the braking force holding function operates at a step r.

Thus, in accordance with the present invention as described above, when the rate of decrease in vehicle velocity is greater than a predetermined value, the operation of the braking forcing valve is inhibited within the set inhibit the period after the brake is released. Accordingly, the apparatus is capable of distinguishing among a state in which the vehicle is at rest, a state in which the wheels are locking up at braking, and a state in which the wheels are locking up due to pumping of the brakes when the vehicle is traveling on a road surface having little friction. This makes it possible to prevent erroneous operation of the braking force holding function.

Though the invention has been described based on the illustrated embodiment, the invention is not limited thereto. For example, in the illustrated embodiment, the invention is applied to a hydraulic brake in a vehicle equipped with an automatic transmission. However, the invention can be applied to a vehicle equipped with a manual transmission and other braking configurations, such as an air brake.

As many apparently widely different embodiments of the present invention can be made without departing from the spirit and scope thereof, it is to be understood that the invention is not limited to the specific embodiment thereof except as defined in the appended claims.

What we claim is:

1. A motor vehicle having a brake and an electronic control apparatus for maintaining a braking force comprising:
    braking force holding valve means for maintaining the braking force in response to receiving a control signal from the electronic control apparatus;
    vehicle velocity sensing means for detecting vehicle traveling velocity and producing a vehicle traveling velocity signal representing the detected vehicle velocity;
    arithmetic means for calculating a rate of decrease in vehicle velocity dependent upon said velocity signal from said vehicle velocity sensing means;
    brake operation sensing means for detecting the vehicle brake being depressed or released and producing a brake signal indicating the vehicle brake being depressed or released;
    time measuring means for counting an inhibit time after the brake is released dependent upon said brake signal from said brake operation sensing means; and
    inhibit means for inhibiting operation of said braking force holding valve means during said inhibit time, after release of the brake as indicated by said brake signal, and when the rate of velocity decrease as calculated by said arithmetic means exceeds a predetermined value.

2. The apparatus according to claim 1, having a master cylinder and wheel cylinder wherein said braking force holding valve means comprises an electromagnetic check valve operatively connected between said master cylinder and said wheel cylinder.

3. The apparatus according to claim 2 further comprising:
    memory means for storing data representing said vehicle velocity signal, said calculated rate of velocity decrease and said brake signal; and
    operation determining means for determining whether to allow operation of said braking force holding valve means, or to allow said inhibit means to inhibit operation of said braking force holding valve means, based on the data stored in said memory means.

4. The apparatus according to claim 2 further comprising:
    determining means for determining whether said calculated rate of vehicle velocity decrease, is greater than or less than, the predetermined value.

5. The apparatus according to claim 1 further comprising:
    memory means for storing data representing said vehicle velocity signal, said calculated rate of velocity decrease and said brake signal; and
    operation determining means for determining whether to allow operation of said braking force holding valve means, or to allow said inhibit means to inhibit operation of said braking force holding valve means, based on the data stored in said memory means.

6. The apparatus according to claim 1 further comprising:
    determining means for determining whether said calculated rate of vehicle velocity decrease, is greater than or less than, the predetermined value.

7. The apparatus according to claim 1 further comprising:
    determining means for determining whether said calculated rate of vehicle velocity decrease, is greater than or less than, the predetermined value; and
    means for allowing operation of said braking force holding valve means, when the calculated rate of vehicle decrease velocity decrease determined by said arithmetic means, is less than the predetermined value, and for allowing operation of said inhibit means, when the calculated rate of vehicle velocity decrease determined by said arithmetic means is equal to or greater than the predetermined value.

* * * * *

UNITED STATES PATENT AND TRADEMARK OFFICE
CERTIFICATE OF CORRECTION

PATENT NO. :  4,864,504
DATED :  September 5, 1989
INVENTOR(S) :  Toshifumi Koshizawa et al.

It is certified that error appears in the above-identified patent and that said Letters Patent is hereby corrected as shown below:

Col. 3,  line 16, "assembly" s/b --valve--;
         line 62, "13" s/b --12--.
Col. 5,  line 16, "canceled," s/b --cancelled.--, "on" s/b --On--;
         line 31, "forcing" s/b --force--, after "force" insert --holding--;
         line 32, "the" (first occurrence) s/b --time--.
Col. 6,  line 60, delete "decrease" (first occurrence).

Signed and Sealed this

Tenth Day of April, 1990

Attest:

HARRY F. MANBECK, JR.

*Attesting Officer*            Commissioner of Patents and Trademarks